(12) United States Patent
Mo et al.

(10) Patent No.: US 10,694,805 B2
(45) Date of Patent: Jun. 30, 2020

(54) INFLATABLE CHARGING DEVICE APPLIED TO A SHOE

(71) Applicant: Microjet Technology Co., Ltd., Hsinchu (TW)

(72) Inventors: Li-Pang Mo, Hsinchu (TW); Shih-Chang Chen, Hsinchu (TW); Chi-Feng Huang, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 329 days.

(21) Appl. No.: 15/949,380

(22) Filed: Apr. 10, 2018

(65) Prior Publication Data

US 2018/0289096 A1  Oct. 11, 2018

(30) Foreign Application Priority Data

Apr. 11, 2017 (TW) .............................. 106112089 A

(51) Int. Cl.
| | |
|---|---|
| *H02J 7/00* | (2006.01) |
| *A43B 3/00* | (2006.01) |
| *A43B 13/14* | (2006.01) |
| *A43B 23/02* | (2006.01) |
| *H02J 7/34* | (2006.01) |

(52) U.S. Cl.
CPC ............ *A43B 3/0015* (2013.01); *A43B 13/14* (2013.01); *A43B 23/029* (2013.01); *H02J 7/342* (2020.01)

(58) Field of Classification Search
CPC ....... Y02E 60/12; H02J 7/0054; H02J 7/1423; H01M 10/44; H01M 10/46
See application file for complete search history.

(56) References Cited

U.S. PATENT DOCUMENTS

| | | | |
|---|---|---|---|
| 5,353,525 A | 10/1994 | Grim | |
| 7,231,730 B1 * | 6/2007 | Ryan | A61H 7/001 36/141 |
| 2005/0188566 A1 * | 9/2005 | Whittlesey | A43B 3/0005 36/127 |
| 2007/0000154 A1 * | 1/2007 | DiBenedetto | A43B 13/181 36/132 |

(Continued)

FOREIGN PATENT DOCUMENTS

| | | |
|---|---|---|
| CN | 103230122 A | 8/2013 |
| CN | 205696053 U | 11/2016 |
| CN | 205714691 U | 11/2016 |

*Primary Examiner* — Arun C Williams
(74) *Attorney, Agent, or Firm* — Birch, Stewart, Kolasch & Birch, LLP

(57) ABSTRACT

An inflatable charging device is applied to a shoe. The shoe includes a shoe body and a bottom part connected therewith. The inflatable charging device includes an inflatable cushion, an air pump, an air passage, a weight sensor, an air pressure sensor, a control module, and a charging power source. When the weight sensor detects a load, the weight sensor sends an enabling signal to the control module, and the control module drives the air pump to operate according to the enabling signal, so that the inflatable cushion is inflated and expanded. When the air pressure sensor detects the pressure inside the inflatable cushion is higher than a specific threshold interval, the air pressure sensor sends a disabling signal to the control module and the control module accordingly stops the operation of the air pump.

9 Claims, 13 Drawing Sheets

(56) References Cited

U.S. PATENT DOCUMENTS

| | | | |
|---|---|---|---|
| 2008/0161734 A1* | 7/2008 | Blockton | A43B 7/147 601/70 |
| 2009/0109659 A1* | 4/2009 | Harris | A43B 3/001 362/103 |
| 2012/0023785 A1* | 2/2012 | Barnes | A43B 7/143 36/141 |
| 2013/0019503 A1* | 1/2013 | Vogt | A43B 7/081 36/103 |
| 2017/0164680 A1* | 6/2017 | Ge | H02J 7/32 |

* cited by examiner

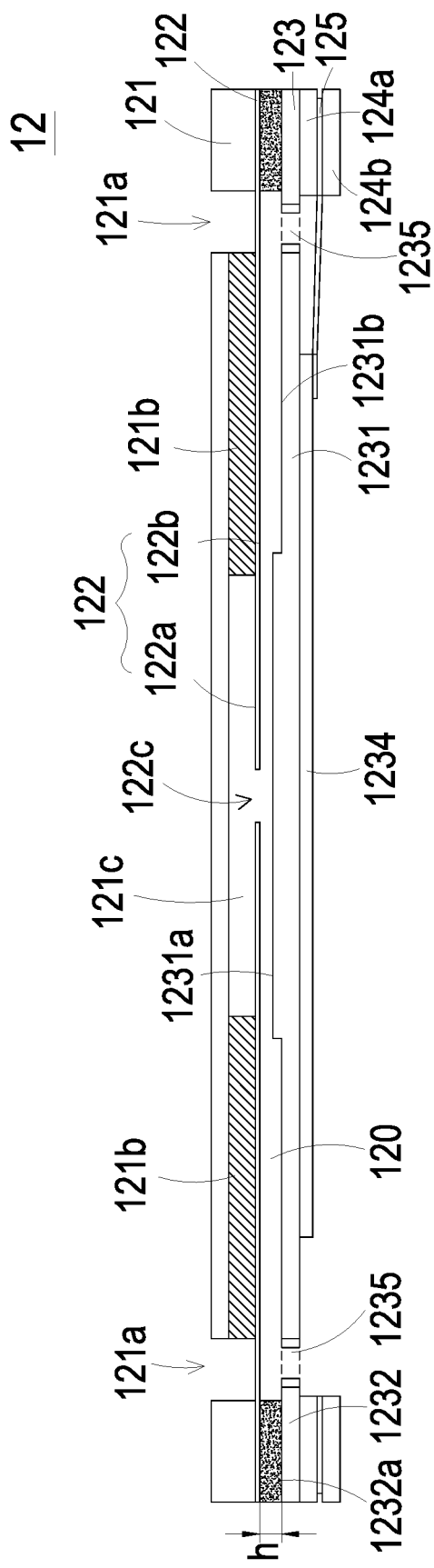
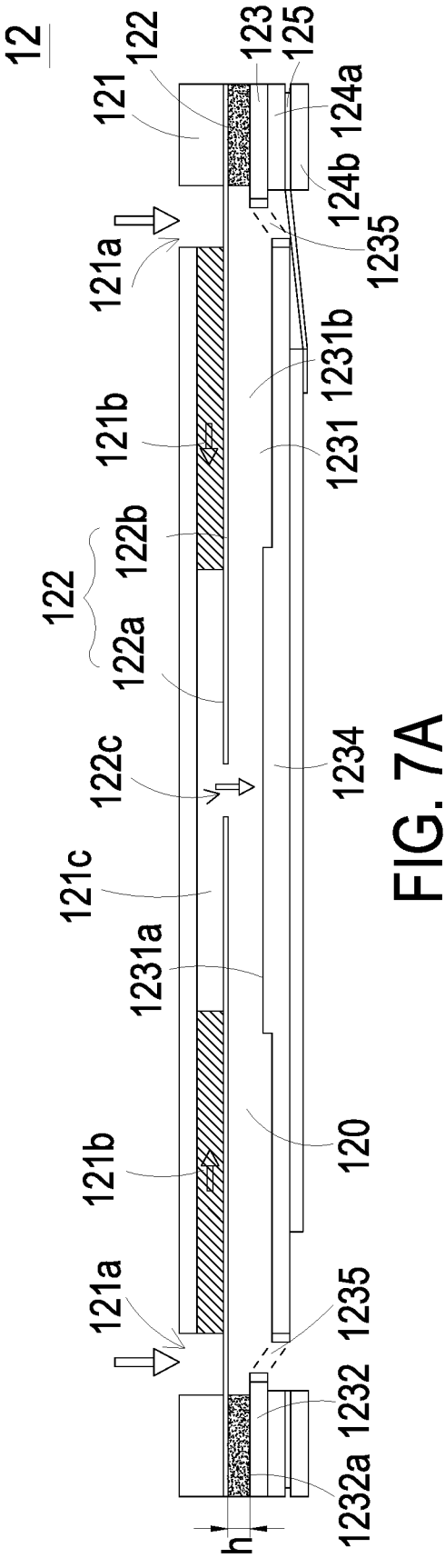
FIG. 6
FIG. 7A

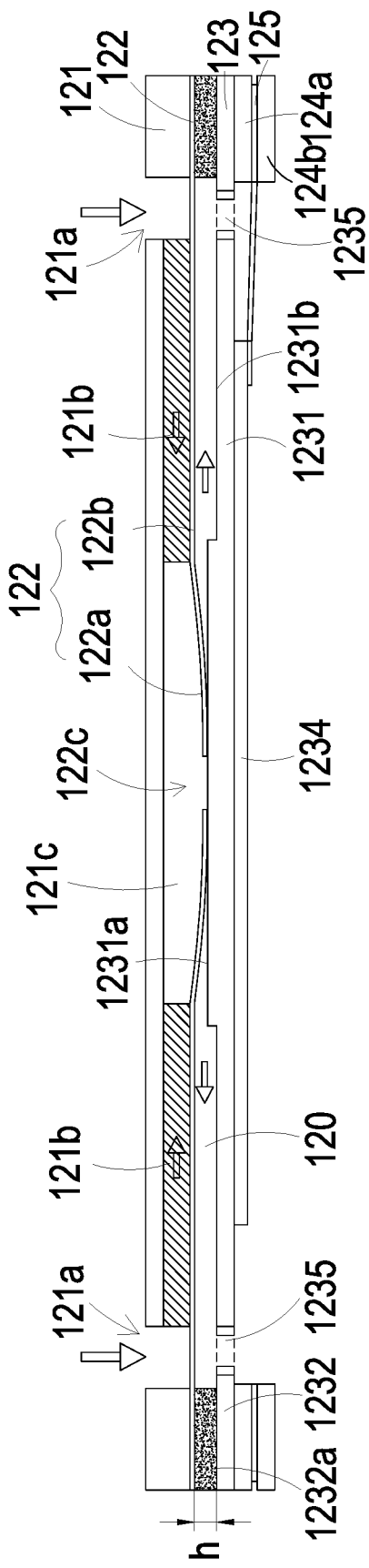
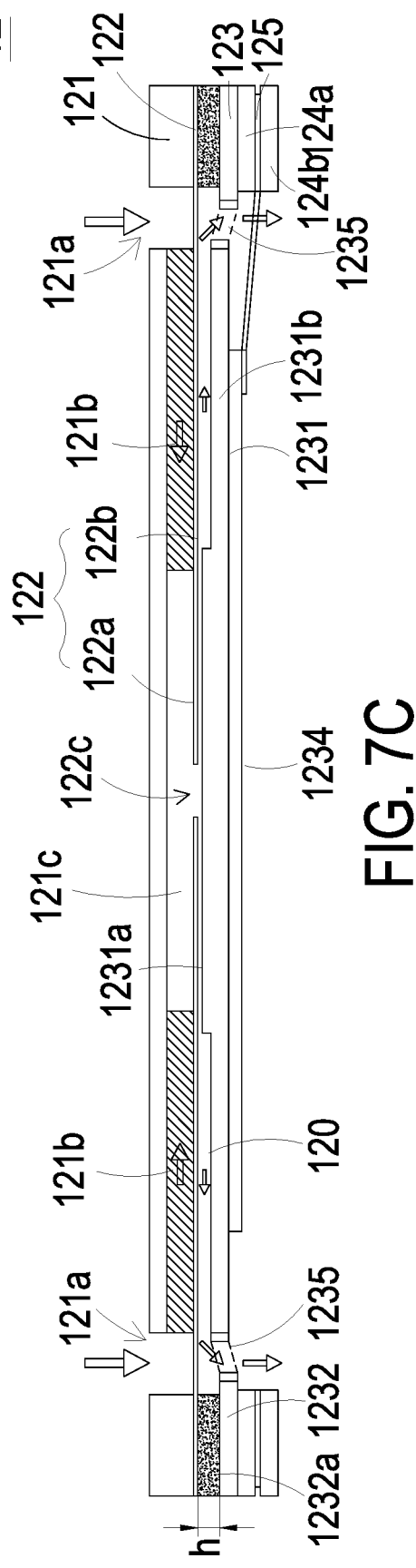
FIG. 7B
FIG. 7C

INFLATABLE CHARGING DEVICE APPLIED TO A SHOE

FIELD OF THE INVENTION

The present invention relates to an inflatable charging device applied to a shoe, and more particularly to an inflatable charging device applied to a shoe and is inflated by an air pump.

BACKGROUND OF THE INVENTION

Generally, shoelaces are used in most shoes as a means of loosening, tying and fixing the shoes on the feet. However, the shoes with shoelaces have many problems in wearing. For example, when the shoelaces are loosened while moving, they have to be retied, resulting in inconvenience and waste of time. Furthermore, there is also potential danger of wearing shoes with shoelaces. For example, when the shoelaces are accidentally loosened, other people may trip over it, or the shoelaces may be involved in the gap of an escalator, a bicycle chain or a motorcycle pin, which may cause accidents. In addition, wearing the shoes with shoelaces in long term may put excessive pressure on the feet and cause discomfort.

Some shoes use other ways, such as a hook and loop fastener or a sock-type shoe body, as a means of loosening, tying, and fixing the feet. However, the hook and loop fastener has insufficient fixity, and is easily detached. The viscosity of the hook and loop fastener may decrease after using for a long period of time, resulting in inconvenience while moving, and the shoes with the hook and loop fastener are inappropriate for wearing during exercise. The sock-type shoe body also has insufficient strength to fix the feet, and the tightness cannot be adjusted according to the requirements. After using for a long period of time, the sock-type shoe body may be loose, and the requirement of fixing the feet is failed to be achieved.

On the other hand, in general, people can only select shoes in different size according to their foot lengths rather than individual foot shapes. It is a common problem that people purchase the shoes which fail to fit the feet well, as their shoe bodies may be too wide, too narrow, too high, or too flat, and wearing unfit shoes to move may cause discomfort and injury.

In addition, people have gradually paid attention to the concept of energy conservation and carbon reduction. Therefore, how to effectively convert items in daily life into technological green energy products has become a very important topic. In prior arts, the function of autonomous power generation has not been widely used in footwear products. However, with the increasing popularity of the portable electronic products (e.g. smart phones, tablet computers, etc.), it has become a big problem that the batteries of those portable electronic products often run out while the user is in the outdoors, and it is difficult to find a place to charge and it is inconvenient to bring an extra portable charger. Therefore, it is a major issue of the present invention to combine comfortable shoes with a charging function for generating enough electric energy that can be used to charge the portable electronic devices, which are carried by the user who wears the shoes.

Therefore, there is a need of providing an inflatable charging device to solve the drawbacks in prior arts, which can be applied to each of a pair of shoes and serving as a power charger, as well as making the shoe automatically adjustable to be adapted to the personal foot shapes and comfortably wrap and fix the feet.

SUMMARY OF THE INVENTION

An object of the present invention provides an inflatable charging device applied to a shoe. The inflatable cushion of the inflatable charging device is disposed on each of a pair of shoes and can be inflated and expanded to fit closely with the wearer's feet, which is adapted to the shape of the feet and is adjustable so as to wrap and fix the wearer's feet well and provide comfortable feeling while wearing.

Another object of the present invention provides an inflatable charging device applied to a shoe and having a charging power source, such that the user's feet movement can be utilized for driving the charging power source to perform autonomous charging, and additional external portable electronic devices can be charged by connecting with the charging power source.

Another object of the present invention provides an inflatable charging device with an air pressure adjustment function. The internal air pressure of an inflatable cushion is automatically adjustable according to usage status, such that the life span of the inflatable cushion is extended and the user can wear the shoes under an optimum pressure in any time.

In accordance with an aspect of the present invention, there is provided an inflatable charging device applied to a shoe, wherein the shoe includes a shoe body and a bottom part connected to the bottom part, and a wear space and an opening therewith are collaboratively defined by the shoe body and the bottom part. The inflatable charging device includes an inflatable cushion, an air passage, an air pump, a weight sensor, an air pressure sensor, a control module, and a charging power source. The inflatable cushion is disposed in the shoe body, and the air passage is arranged between the inflatable cushion and the shoe body and is in air communication with the inflatable cushion. The air pump is communicated with the air passage, the weight sensor is disposed on the bottom part, and the air pressure sensor is disposed in the air passage. The control module is electrically connected with the air pump, the weight sensor, and the air pressor sensor. The charging power source is embedded in the bottom part and electrically connected with the control module. The charging power source includes a pressing plate, a pressure electric generator, a rechargeable battery, and a power source output port. One end of the pressing plate is pivotally connected with the pressure electric generator, and another end of the pressing plate is disposed on the bottom part for being pressed down by a foot of the user by which the pressure electric generator generates electric power. The rechargeable battery is used for storing the electric power generated by the pressure electric generator and providing electric power to the control module. The power source output port is connected with the electric power outputted from the rechargeable battery for charging an external electronic device. When the weight sensor detects a load, the weight sensor sends an enabling signal to the control module, and the control module drives the air pump to operate according to the enabling signal, making air guided by the air passage and introduced into the inflatable cushion, so that the inflatable cushion is inflated and expanded. When the air pressure sensor detects the pressure inside the inflatable cushion is higher than a specific threshold interval, the air pressure sensor sends a disabling signal to the control module, and the operation of the air pump is stopped by the control module according to the disabling signal.

The above contents of the present invention will become more readily apparent to those ordinarily skilled in the art after reviewing the following detailed description and accompanying drawings, in which:

BRIEF DESCRIPTION OF THE DRAWINGS

FIG. 6 schematically illustrates the cross-sectional view of the structure of the air pump of FIGS. 4A and 4B; and FIG. 7A to FIG. 7E schematically illustrate the actions of the air pump of FIGS. 4A and 4B.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
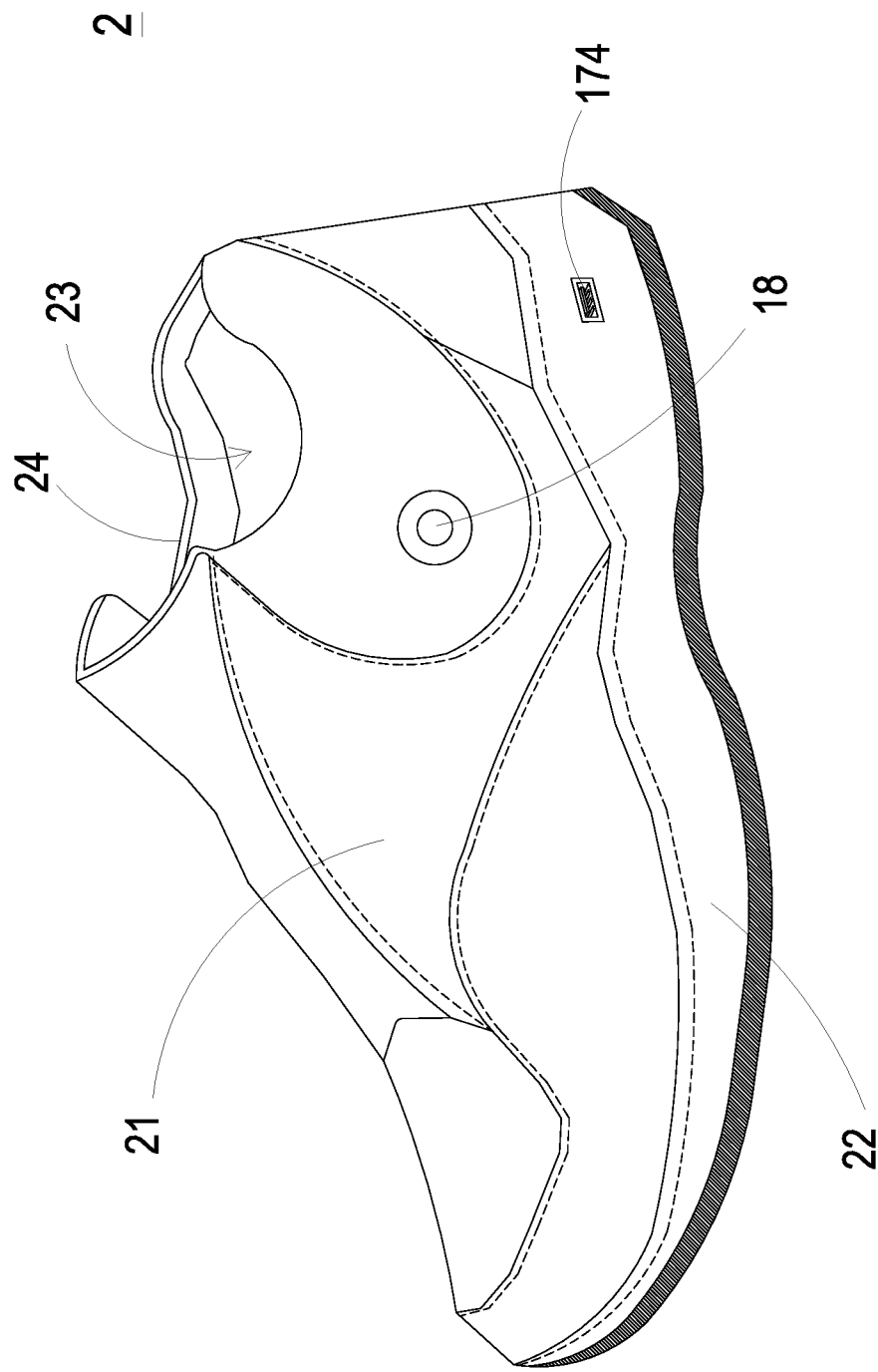
FIG. 1A schematically illustrates the inflatable charging device applied to a shoe according to an embodiment of the present invention.
Figure 1B:
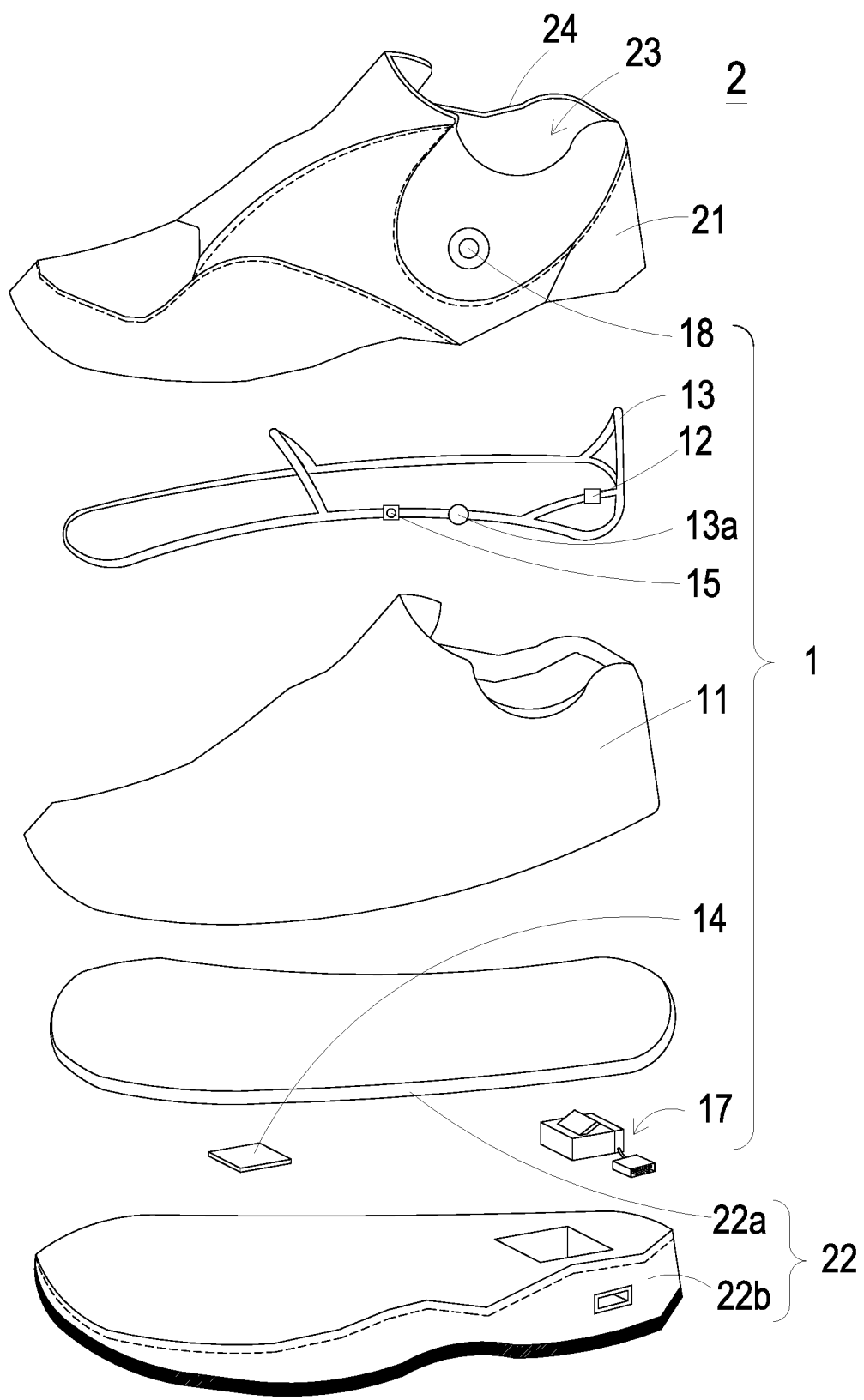
FIG. 1B schematically illustrates the exploded structure of the shoe in FIG. 1A.

Please refer to FIG. 1A and FIG. 1B. FIG. 1A schematically illustrates the inflatable charging device applied to a shoe, according to an embodiment of the present invention. FIG. 1B schematically illustrates the exploded structure of the shoe in FIG. 1A. The inflatable charging device 1 can be applied to various kinds of shoes, such as sneakers, sandals, or high heels, but not limited herein. In this embodiment, the inflatable charging device 1 is applied to a shoe 2 as an example. The shoe 2 includes a shoe body 21 and a bottom part 22. As shown in FIG. 1B, the bottom part 22 further includes an insole 22a and a sole 22b. The shoe body 21 is connected to the sole 22b of the bottom part 22 to define a wear space 23 and an opening 24. The insole 22a is disposed in the wear space 23 and connected to the sole 22b. The shape of the insole 22a is substantially the same as the shape of the sole 22b, while the insole 22a is slightly smaller than the sole 22b. Furthermore, the external appearance, the thickness and the like of the insole 22a and the sole 22b may be changed depending on practical applications. One of the user's foot can be inserted into or detached from the shoe 2 through the opening 24 of the shoe body 21, and can be accommodated in the wear space 23 after the user's foot is inserted into the shoe 2 through the opening 24.

Figure 1C:
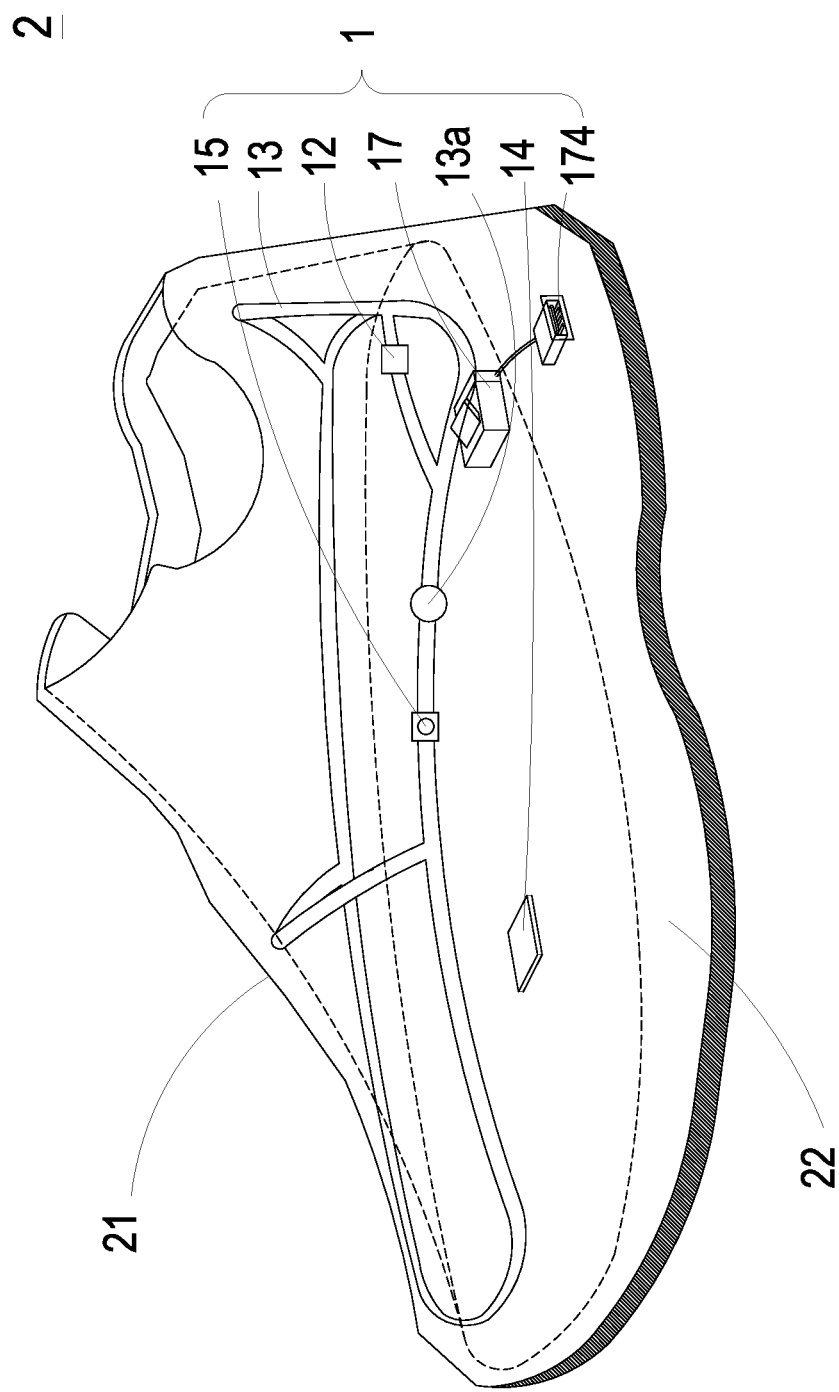
FIG. 1C schematically illustrates the shoe in FIG. 1A, in which the shoe body of the shoe is shown as a see-through object for showing the inflatable charging device inside.
Figure 2:
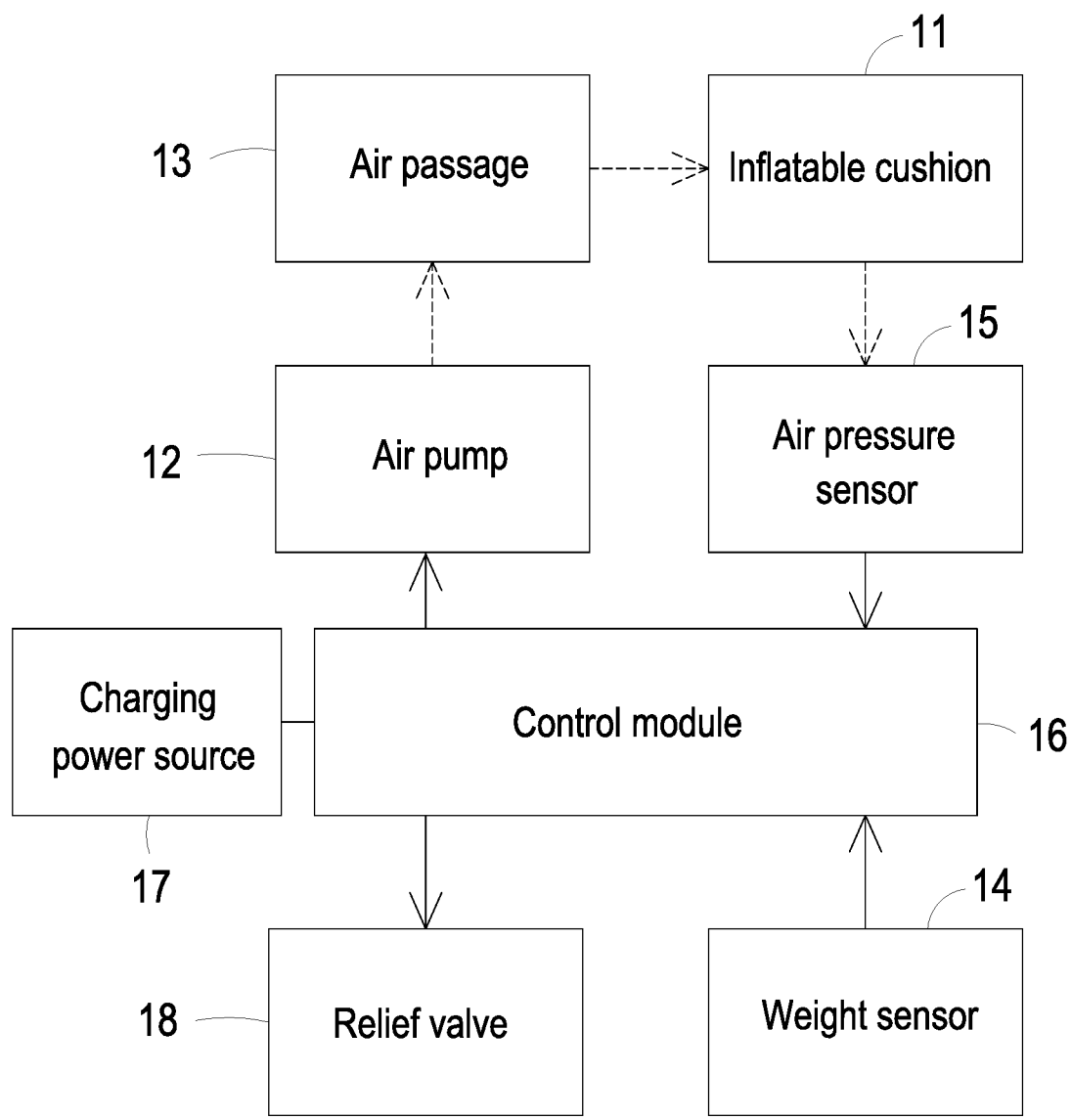
FIG. 2 schematically illustrates the architecture of the inflatable charging device according to an embodiment of the present invention.

Please refer to FIG. 1B to FIG. 1C and FIG. 2. FIG. 1C schematically illustrates the shoe in FIG. 1A, in which the shoe body is shown as a see-through object for showing the inflatable charging device inside. As shown in FIG. 1B to FIG. 1C and FIG. 2, the inflatable charging device 1 includes but not limited to the components of an inflatable cushion 11, an air pump 12, an air passage 13, a weight sensor 14, an air pressure sensor 15, a control module 16, a charging power source 17, and a relief valve 18. The inflatable cushion 11 is a component that can be expanded by inflating air, and the inflatable cushion 11 is disposed in the shoe body 21 of the shoe 2. The air passage 13 is constructed by connecting a plurality of hollow hoses, but not limited thereto. The air passage 13 is arranged between the inflatable cushion 11 and the shoe body 21, and is communicated with the inflatable cushion 11 for transferring air. In this embodiment, the inflatable cushion 11 is an inflatable and expandable structure which may be integrally formed, and one surface of the inflatable cushion 11 may have a plurality of inflatable cushion holes (not shown). The air passage 13 may also have a plurality of air passage holes (not shown), wherein the number, size and position of the air passage holes of the air passage 13 correspond to those of the inflatable cushion holes of the inflatable cushion 11. The air passage 13 and the inflatable cushion 11 are communicated through the connection of the air passage holes and the inflatable cushion holes, so as to achieve the air circulation between the air passage 13 and the inflatable cushion 11. In this embodiment, the charging power source 17 is embedded in the sole 22b of the bottom part 22 and electrically connected with the control module 16 for supplying electrical energy, and the relief valve 18 is used for adjusting the internal pressure of the inflatable cushion 11 and the air passage 13, the features of them will be described in detail later in the description.

As shown in FIG. 1B and FIG. 1C, the air pump 12 is communicated with the air passage 13 for guiding external air into the air passage 13. In this embodiment, the weight sensor 14 is embedded in between the insole 22a and the sole 22b, but not limited thereto. The weight sensor 14 is used for detecting a load and sending a signal according to the detected load. The air pressure sensor 15 is disposed in the air passage 13 for detecting the air pressure inside the inflatable cushion 11 and sending a signal according to the detected air pressure. In this embodiment, since the inflatable charging device 1 is disposed in the shoe 2 as shown in FIG. 1C, the air pump 12 is operable to perform an inflation operation by which the air is pumped into the air passage 13 and the inflatable cushion 11 is expanded to wrap the user's foot, so that sufficient support and protection are provided and the inflatable cushion 11 is adjustable to fit the shape of the user's foot to increase comfort.

Please refer to FIG. 2. FIG. 2 schematically illustrates the architecture of an inflatable charging device according to an embodiment of the present invention. In this embodiment, the inflatable charging device 1 further includes a control system including a control module 16, a charging power source 17 and a relief valve 18. The control module 16 is electrically connected with the air pump 12, the weight sensor 14, the air pressor sensor 15, the charging power source 17 and the relief valve 18, respectively. The control module 16 respectively receives the signals sent from the weight sensor 14 and the air pressure sensor 15, and enables or disables the air pump 12 according to the received signals. When the control module 16 of the control system drives the air pump 12, the air is pumped into the air passage 13 by the air pump 12 and introduced into the inflatable cushion 11, and the air pressure inside the inflatable cushion 11 is monitored by the air pressure sensor 15, which is disposed in the air passage 13. When the air pressure sensor 15 detects that the air pressure inside the inflatable cushion 11 is higher than a specific threshold interval, the air pressure sensor 15 sends a disabling signal to the control module 16 to stop the operation of the air pump 12. Oppositely, when the air pressure sensor 15 detects that the air pressure inside the inflatable cushion 11 is lower than the specific threshold interval, the air pressure sensor 15 sends an enabling signal to the control module 16 to enable the air pump 12. In addition, the relief valve 18 is a pressure adjustment mechanism disposed on an exterior surface of the shoe body 21 (as shown in FIG. 1A), and electrically connected with the control module 16. After the control module 16 receives a pressure relief signal sent from the weight sensor 14, the control module 16 correspondingly controls the relief valve 18 to perform a pressure relief action. The control module 16 may be disposed on the inner side of the shoe body 21. For example, the control module 16 may be disposed on the inner side adjacent to the relief valve 18 or adjacent to the air pump 12, but not limited thereto.

Figure 3A:
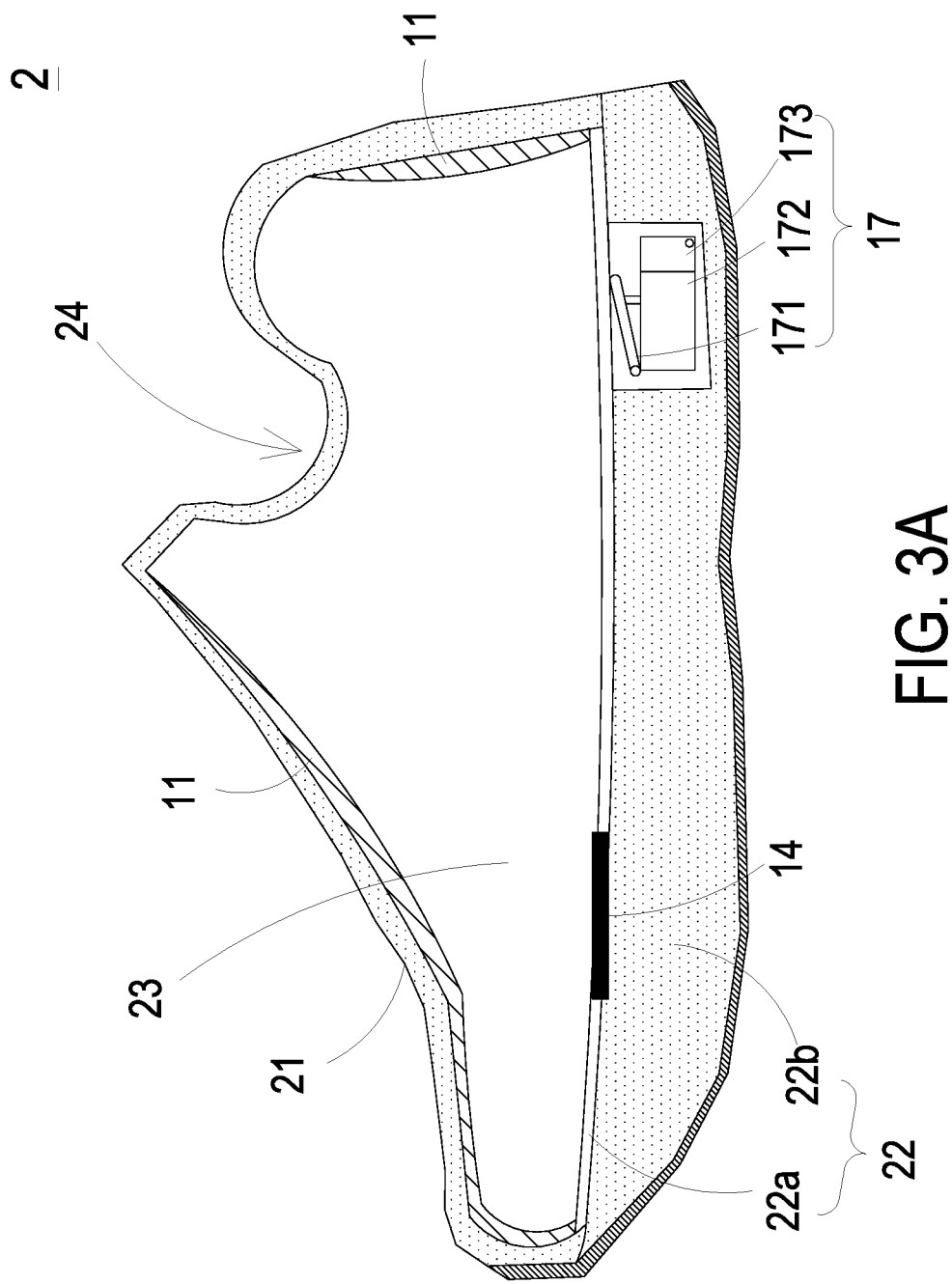
FIG. 3A schematically illustrates the cross-sectional view of a shoe to which the inflatable charging device according to an embodiment of the present invention is applied.

Please refer to FIG. 1B, FIG. 1C, and FIG. 3A. FIG. 3A schematically illustrates the cross-sectional view of a shoe to which the inflatable charging device according to an embodiment of the present invention is applied. As shown in FIG. 3A, in this embodiment, the charging power source 17 is embedded in the sole 22b. The charging power source 17 comprises a pressing plate 171, a pressure electric generator 172, a rechargeable battery 173, and a power source output port 174. The pressing plate 171 is serving as a lever, while one end of the pressing plate 171 is pivotally connected with the pressure electric generator 172, and another end of the pressing plate 171 is disposed under the insole 22a. The pressure electric generator 172 is a mechanism capable of generating electric energy by converting a linear motion into a rotational motion. That is, when the pressing plate 171 is pressed to move downwardly, the pressure electric generator 172 generates electric energy. The rechargeable battery 173 is disposed in the pressure electric generator 172 for storing the electric energy generated by the pressure electric generator 172. The rechargeable battery 173 provides electric power to the control module 16, so that the shoe inflation and charging device 1 can be enabled to operate without an external power supply, avoiding the inconvenience of replacing battery and saving energy. As shown in FIG. 1B and FIG. 1C, in this embodiment, the power source output port 174 may be an external pluggable socket, such as a universal serial bus hub (USB hub), but not limited herein. The power source output port 174 may be embedded on the surface of the bottom part 22, and the power source output port 174 is electrically connected with the rechargeable battery 173, so that the power source output port 174 is connected with the electric power outputted from the rechargeable battery 173. As a result, the power source output port 174 is capable of charging an external electronic device (not shown), such as a mobile phone or a tablet computer, etc., by transmitting the electric energy stored in the rechargeable battery 173 to the external portable electronic device.

Figure 3B:
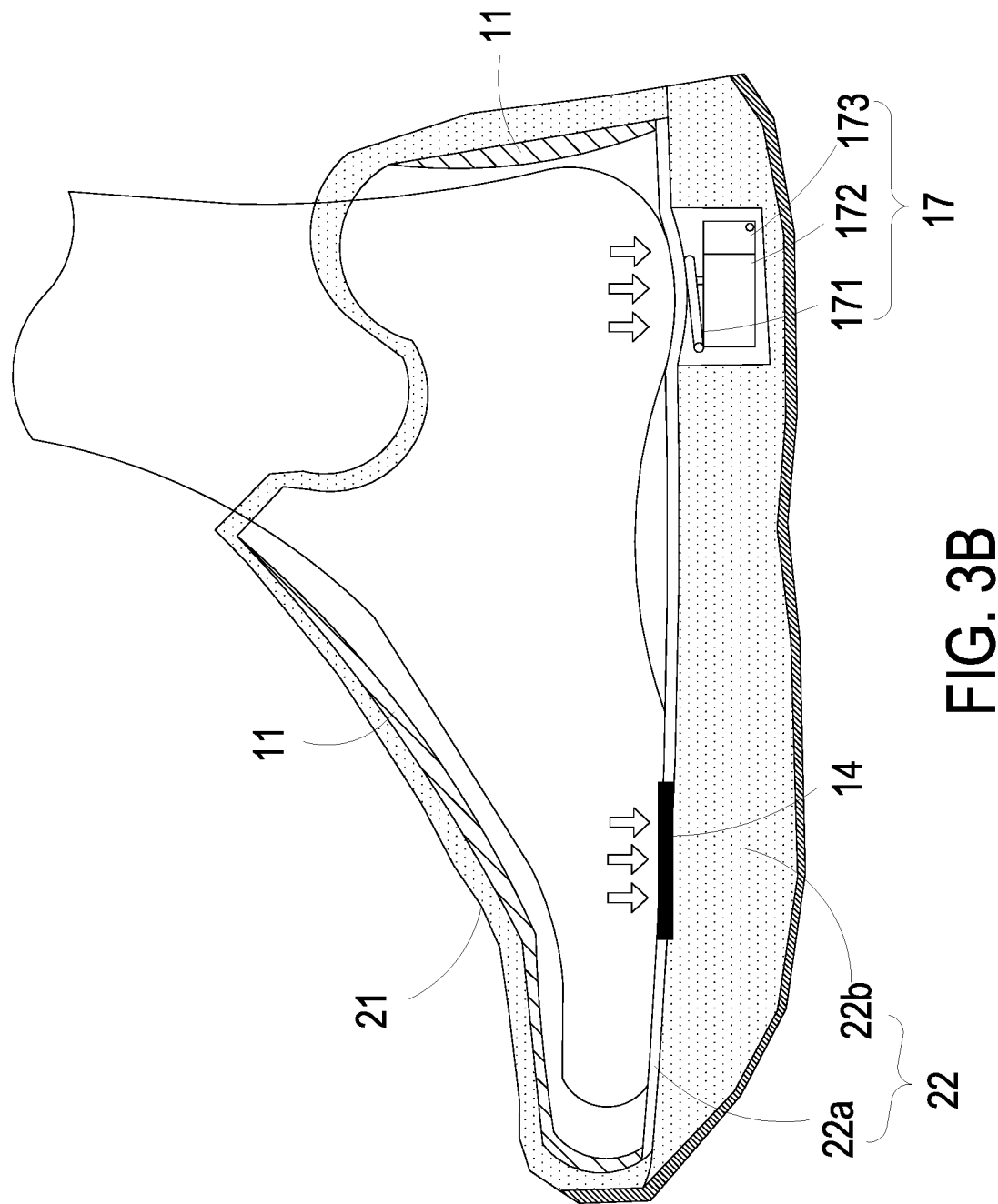
FIG. 3B schematically illustrates the cross-sectional view of the shoe in FIG. 3A, in which the shoe is initially worn.
Figure 3C:
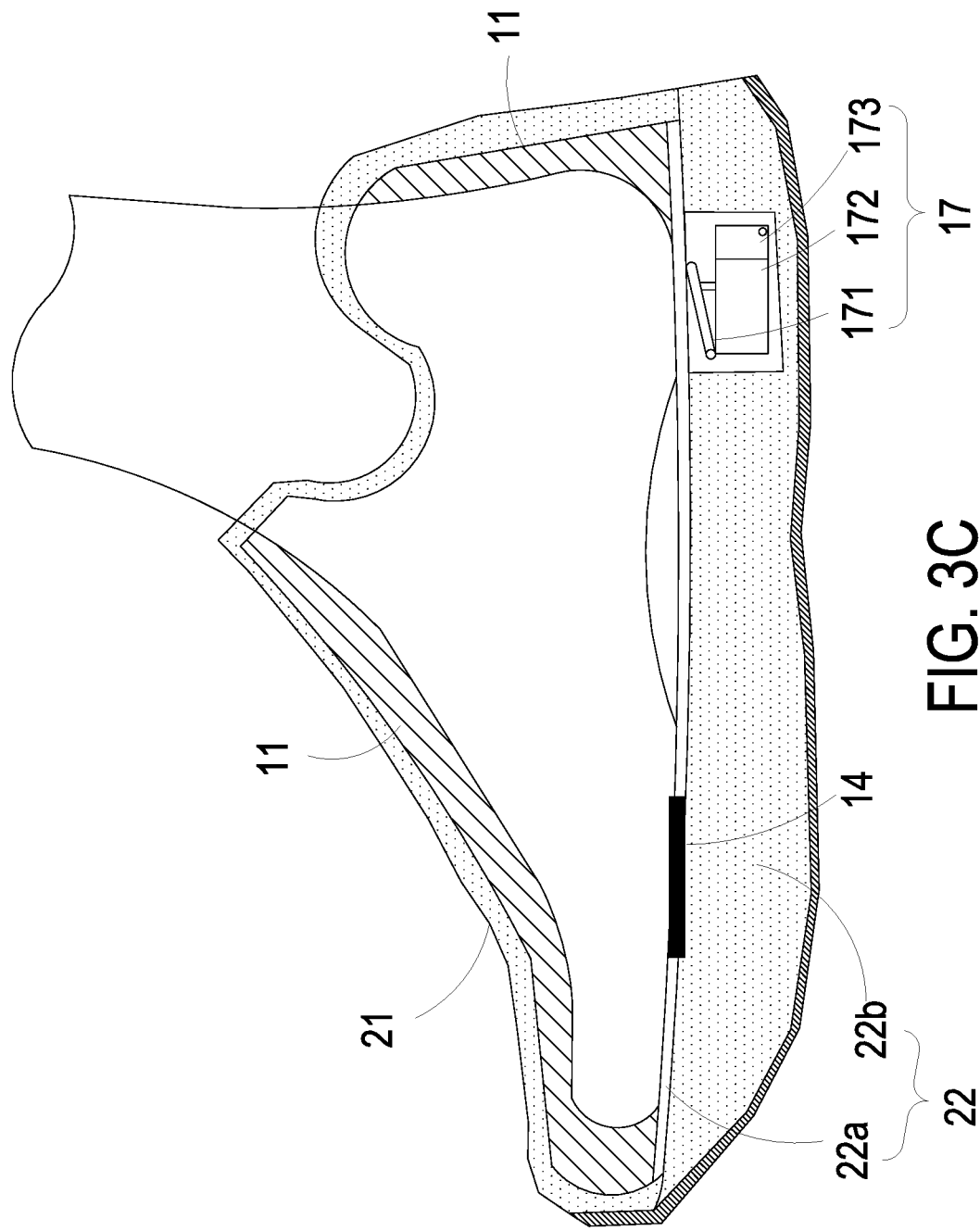
FIG. 3C schematically illustrates the cross-sectional view of the shoe in FIG. 3A, in which the shoe is worn and inflated.

Please refer to FIG. 2 to FIG. 3C. FIG. 3B schematically illustrates the cross-sectional view of the shoe in FIG. 3A, in which the shoe is initially worn. FIG. 3C schematically illustrates the cross-sectional view of the shoe in FIG. 3A, in which the shoe is worn and inflated. As shown in FIG. 3A, in this embodiment, when the weight sensor 14 of the inflatable charging device 1 does not detect any load, which means the shoe 2 is not being worn, the inflatable cushion 11 is not inflated and the shoe body 21 has larger wear space 23. As shown in FIG. 3B, when the weight sensor 14 detects a load, which means the shoe 2 is being worn by a foot, the weight sensor 14 sends an enabling signal to the control module 16 according to the detected weight, and the control module 16 accordingly drives the air pump 12 to operate. Thus, the air is introduced to the inflatable cushion 11 through the air passage 13, so that the inflatable cushion 11 is inflated and expanded to fit closely with the foot, as shown in FIG. 3C. At this moment, the wear space 23 inside the shoe body 21 is filled up with the foot and the expanded inflatable cushion 11. Through the expansion of the inflatable cushion 11, the inflatable cushion 11 can fit individual foot with different shapes, so that the user's foot is comfortably wrapped and fixed. In addition, while the user is walking or running as the user's foot is wearing the shoe 2, the foot keeps pressing the pressing plate 171 of the charging power source 17 to produce a vertical reciprocating movement of the pressing plate 171, so that the pressure electric generator 172 can generate electric energy. The generated electric energy is stored in the rechargeable battery 173, and the rechargeable battery 173 maintains a certain amount of storage of electric energy for use. The rechargeable battery 173 is capable of providing electric power to the control module 16. Moreover, the rechargeable battery 173 is capable of providing electric power to an external electronic device. When a portable electronic device held by the user runs out of battery, the user can charge the portable electronic device by connecting it with the power source output port 174 of the charging power source 17, through which the electric energy stored in the rechargeable battery 173 can output to the connected portable electronic device.

Furthermore, in this embodiment, when the air pump 12 is enabled and inflates the inflatable cushion 11, the control module 16 controls the air pressure sensor 15 to detect gas pressure inside the inflatable cushion 11 at the same time. When the air pressure sensor 15 detects that the pressure inside the inflatable cushion 11 is higher than a specific threshold interval, the air pressure sensor 15 sends a disabling signal to the control module 16, and the operation of the air pump 12 is stopped by the control module 16 according to the disabling signal. As so, the pressure inside the inflatable cushion 11 is prevented from becoming too high, which may cause discomfort to the user's foot. Oppositely, when the air pressure sensor 15 detects that the pressure inside the inflatable cushion 11 is lower than the specific threshold interval, the air pressure sensor 15 sends an enabling signal to the control module 16, and the control module 16 drives the air pump 12 to operate according to the enabling signal. Through monitoring the pressure and accordingly control it by the air pressure sensor 15, the degree of expansion of the inflatable cushion 11 is automatically adjustable, which makes the shoe 2 comfortable and safe to wear.

In addition, the inflatable charging device 1 of this embodiment has an air pressure adjustment function. As shown in FIG. 1A, FIG. 1B, and FIG. 2, the inflatable charging device 1 includes the relief valve 18, which is disposed on the exterior surface of the shoe body 21 of the shoe 2, and may be but not limited to a switchable valve structure. As shown in FIG. 1B, the air passage 13 further includes a relief valve opening 13a spatially corresponding to the relief valve 18 and communicated therewith. As described above, the relief valve 18 is electrically connected with the control module 16 for being controlled to discharge the air inside the inflatable cushion 11 out of the shoe 2 through the air passage 13 by the relief valve 18. To explain in detail, when the user is wearing the shoe 2 and the weight sensor 14 detects loss or disappearance of the weight of the load, which may happen when the user is sitting or starting to take off the shoe 2, the weight sensor 14 sends a disabling signal as well as a pressure relief signal to the control module 16. After receiving the disabling signal and the pressure relief signal, the control module 16 disables the operation of the air pump 12 according to the disabling signal and drives the relief valve 18 to open according to the pressure relief signal, so that at least a part of the air inside the inflated and expanded inflatable cushion 11 is discharged out of the shoe 2 through the relief valve 18. Consequently, the internal air pressure of the inflatable charging device 1 is adjusted automatically and intelligently according to the usage status of the shoe 2, so that the user is provided with an optimum state for wearing. Moreover, since the inflatable cushion 11 is prevented from being inflated for a long time unnecessarily, the use life of the inflatable cushion 11 is prolonged.

In some embodiments, the relief valve 18 may be but not limited to a rotary button which is to be actuated manually. By turning the rotary button, the relief valve 18 is switched between the closed state and the open state. Therefore, the user can turn the rotary button according to requirements to adjust the internal air pressure of the inflatable charging device 1. For example, the user can turn the rotary button to switch the release valve 18 to the open state, thus the release valve 18 is in communication with the outside of the shoe 2 and the air inside the inflatable cushion 11 is released. After the internal air pressure has adjusted to a desired level, the user can turn the rotary button to switch the release valve 18 to the closed state, thereby preventing the air from releasing excessively, which may result in insufficient of pressure. By disposing the rotary button, the inflated and expanded inflatable cushion 11 can closely fit the user's foot and not being too tight for the user, so as to achieve an optimum status for the user to wear.

Figure 4A:
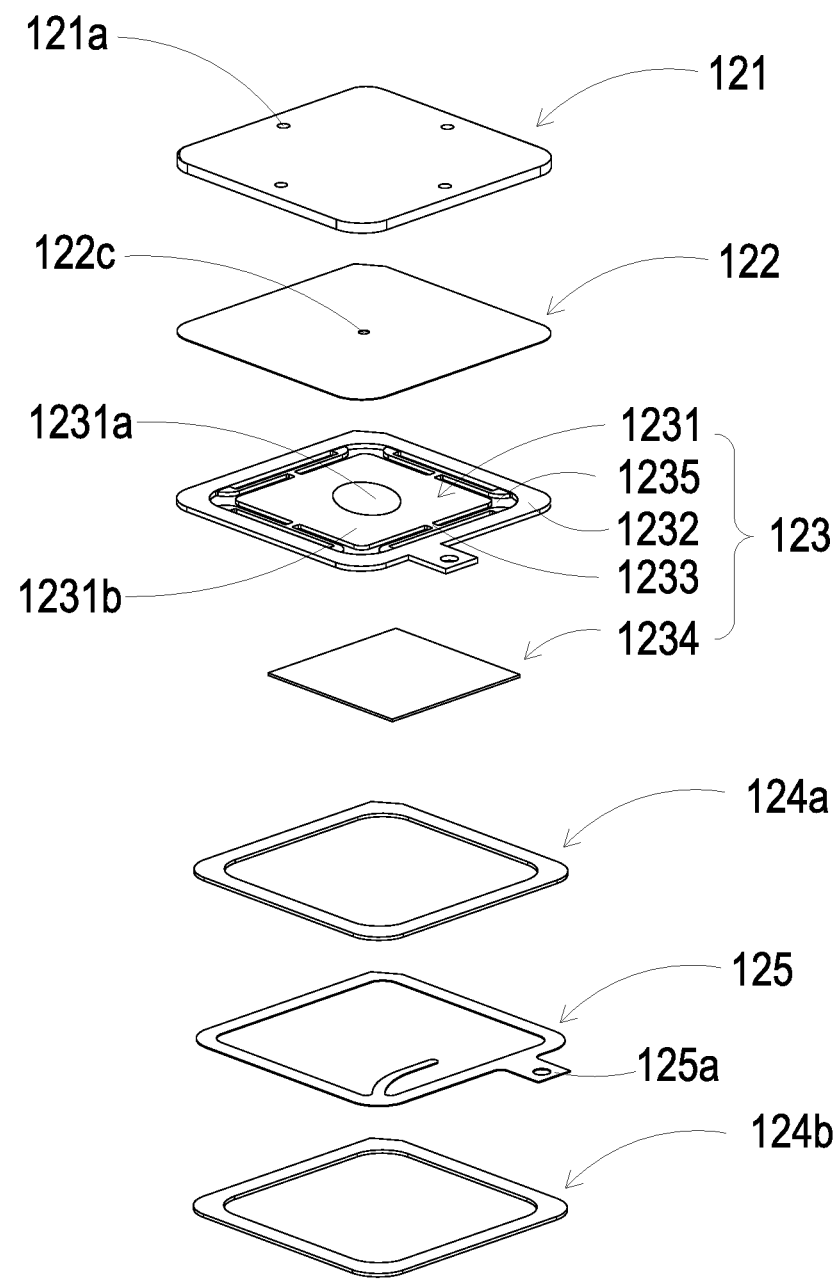
FIG. 4A and FIG. 4B respectively schematically illustrate the exploded structure in different perspectives of an air pump according to an embodiment of the present invention.
Figure 4B:
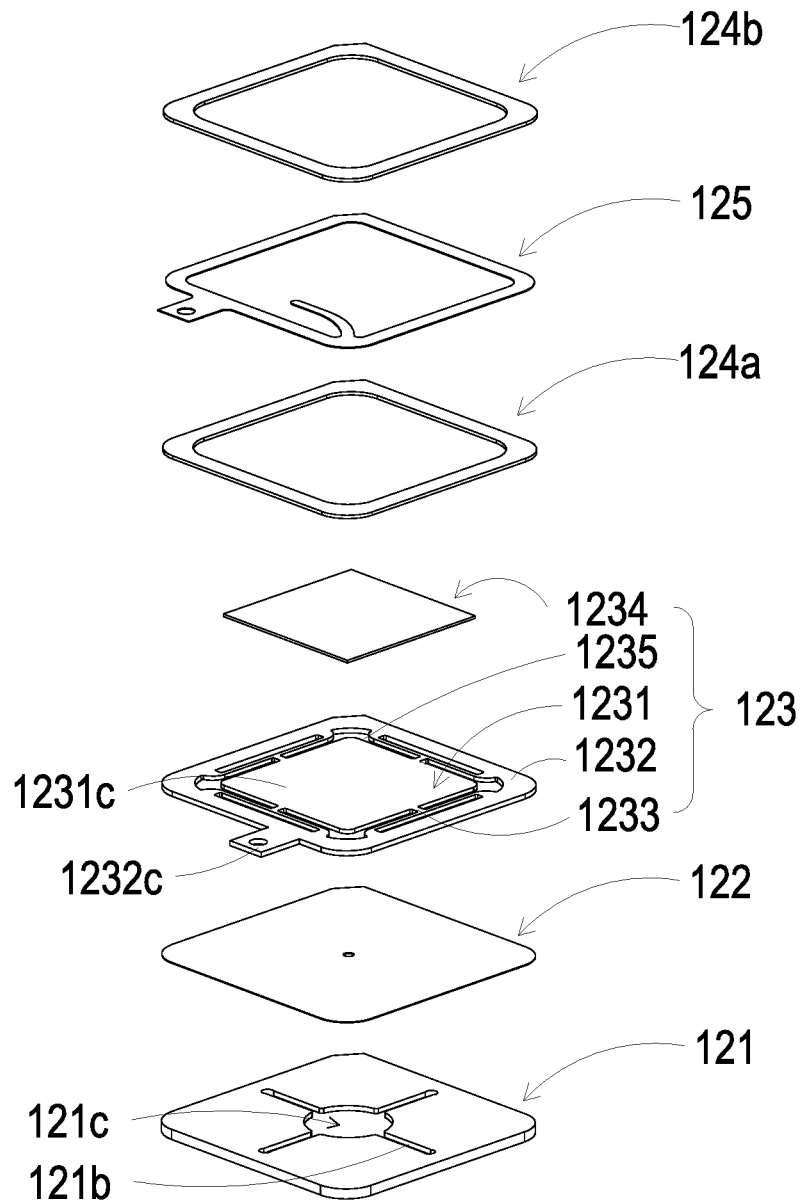
Figure 5:
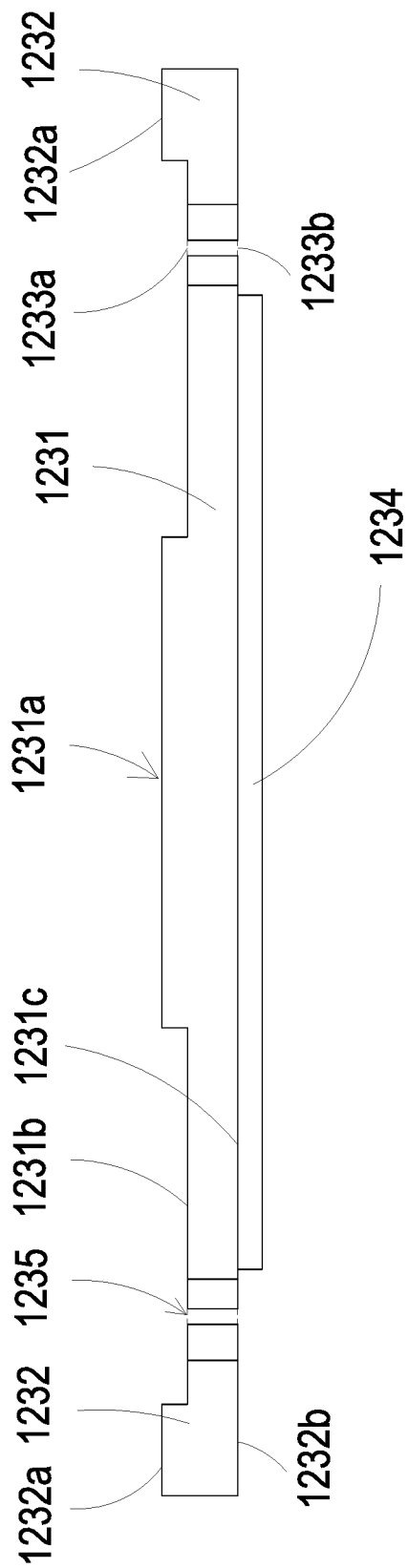
FIG. 5 schematically illustrates the cross-sectional view of the structure of the piezoelectric actuator of FIGS. 4A and 4B.

FIG. 4A and FIG. 4B respectively schematically illustrate the exploded structure in different perspectives of an air pump according to an embodiment of the present invention. FIG. 5 schematically illustrates the cross-sectional view of the structure of the piezoelectric actuator of FIGS. 4A and 4B. FIG. 6 schematically illustrates the cross-sectional view of the structure of the air pump of FIGS. 4A and 4B. As shown in FIG. 4A, FIG. 4B, FIG. 5 and FIG. 6, the air pump 12 is a piezoelectric air pump. Moreover, the air pump 12 comprises a gas inlet plate 121, a resonance plate 122, a piezoelectric actuator 123, a first insulation plate 124a, a conducting plate 125 and a second insulation plate 124b. The piezoelectric actuator 123 is aligned with the resonance plate 122. The gas inlet plate 121, the resonance plate 122, the piezoelectric actuator 123, the first insulation plate 124a, the conducting plate 125 and the second insulation plate 124b are stacked on each other sequentially. After the above components are combined together, the cross-sectional view of the resulting structure of the air pump 12 is shown in FIG. 6.

The gas inlet plate 121 comprises at least one inlet 121a. Preferably but not exclusively, the gas inlet plate 121 comprises four inlets 121a. The inlets 121a run through the gas inlet plate 121. In response to the action of the atmospheric pressure, the air is introduced into the air pump 12 through the inlets 121a. Moreover, at least one convergence channel 121b is formed on a first surface of the gas inlet plate 121, and is in communication with the at least one inlet 121a in a second surface of the gas inlet plate 121. Moreover, a central cavity 121c is located at the intersection of the four convergence channels 121b. The central cavity 121c is in communication with the at least one convergence channel 121b, such that the gas entered by the inlets 121a would be introduced into the at least one convergence channel 121b and is guided to the central cavity 121c. Consequently, the air can be transferred by the air pump 12. In this embodiment, the at least one inlet 121a, the at least one convergence channel 121b and the central cavity 121c of the gas inlet plate 121 are integrally formed. The central cavity 121c is a convergence chamber for temporarily storing the air. Preferably but not exclusively, the gas inlet plate 121 is made of stainless steel. In some embodiments, the depth of the convergence chamber defined by the central cavity 121c is equal to the depth of the at least one convergence channel 121b. The resonance plate 122 is made of a flexible material, which is preferably but not exclusively copper. The resonance plate 122 further has a central aperture 122c corresponding to the central cavity 121c of the gas inlet plate 121 that providing the gas for flowing through.

The piezoelectric actuator 123 comprises a suspension plate 1231, an outer frame 1232, at least one bracket 1233 and a piezoelectric plate 1234. The piezoelectric plate 1234 is attached on a first surface 1231c of the suspension plate 1231. In response to an applied voltage, the piezoelectric plate 1234 would be subjected to a deformation. When the piezoelectric plate 1233 is subjected to the deformation, the suspension plate 1231 is subjected to a curvy vibration. The at least one bracket 1233 is connected between the suspension plate 1231 and the outer frame 1232, while the two ends of the bracket 1233 are connected with the outer frame 1232 and the suspension plate 1231 respectively that the bracket 1233 can elastically support the suspension plate 1231. At least one vacant space 1235 is formed between the bracket 1233, the suspension plate 1231 and the outer frame 1232 for allowing the air to go through. The type of the suspension plate 1231 and the outer frame 1232 and the type and the number of the at least one bracket 1233 may be varied according to the practical requirements. The outer frame 1232 is arranged around the suspension plate 1231. Moreover, a conducting pin 1232c is protruding outwardly from the outer frame 1232 so as to be electrically connected with an external circuit (not shown).

As shown in FIG. 5, the suspension plate 1231 has a bulge 1231a that makes the suspension plate 1231 a stepped structure. The bulge 1231a is formed on a second surface 1231b of the suspension plate 1231. The bulge 1231b may be a circular convex structure. A top surface of the bulge 1231a of the suspension plate 1231 is coplanar with a second surface 1232a of the outer frame 1232, while the second surface 1231b of the suspension plate 1231 is coplanar with a second surface 1233a of the bracket 1233. Moreover, there is a drop of specified amount from the bulge 1231a of the suspension plate 1231 (or the second surface 1232a of the outer frame 1232) to the second surface 1231b of the suspension plate 1231 (or the second surface 1233a of the bracket 1233). A first surface 1231c of the suspension plate 1231, a first surface 1232b of the outer frame 1232 and a first surface 1233b of the bracket 1233 are coplanar with each other. The piezoelectric plate 1234 is attached on the first surface 1231c of the suspension plate 1231. The suspension plate 1231 may be a square plate structure with two flat surfaces but the type of the suspension plate 1231 may be varied according to the practical requirements. In this embodiment, the suspension plate 1231, the at least bracket 1233 and the outer frame 1232 are integrally formed and produced by using a metal plate (e.g., a stainless steel plate). In an embodiment, the length of the piezoelectric plate 2234 is smaller than the length of the suspension plate 1231. In another embodiment, the length of the piezoelectric plate 1234 is equal to the length of the suspension plate 1231. Similarly, the piezoelectric plate 1234 is a square plate structure corresponding to the suspension plate 1231.

In an embodiment, as shown in FIG. 4A, in the air pump 12, the first insulation plate 124a, the conducting plate 125 and the second insulation plate 124b are stacked on each other sequentially and located under the piezoelectric actuator 123. The profiles of the first insulation plate 124a, the conducting plate 125 and the second insulation plate 124b substantially match the profile of the outer frame 1232 of the piezoelectric actuator 123. The first insulation plate 124a and the second insulation plate 124b are made of an insulating material (e.g. a plastic material) for providing insulating efficacy. The conducting plate 125 is made of an electrically conductive material (e.g. a metallic material) for providing electrically conducting efficacy. Moreover, the conducting plate 125 has a conducting pin 125a so as to be electrically connected with an external circuit (not shown).

In an embodiment, as shown in FIG. 6, the gas inlet plate 121, the resonance plate 122, the piezoelectric actuator 123, the first insulation plate 124a, the conducting plate 125 and the second insulation plate 124b of the air pump 12 are stacked on each other sequentially. Moreover, there is a gap h between the resonance plate 122 and the outer frame 1232 of the piezoelectric actuator 123, which is formed and maintained by a filler (e.g. a conductive adhesive) inserted therein in this embodiment. The gap h ensures the proper distance between the bulge 1231a of the suspension plate 1231 and the resonance plate 122, so that the contact interference is reduced and the generated noise is largely reduced. In some embodiments, the height of the outer frame 1232 of the piezoelectric actuator 123 is increased, so that the gap is formed between the resonance plate 122 and the piezoelectric actuator 123.

After the gas inlet plate 121, the resonance plate 122 and the piezoelectric actuator 123 are combined together, a movable part 122a and a fixed part 122b of the resonance plate 122 are defined. A convergence chamber for converging the air is defined by the movable part 122a of the resonance plate 122 and the gas inlet plate 121 collaboratively. Moreover, a first chamber 120 is formed between the resonance plate 122 and the piezoelectric actuator 123 for temporarily storing the air. Through the central aperture 122c of the resonance plate 122, the first chamber 120 is in communication with the central cavity 121c of the gas inlet plate 121. The peripheral regions of the first chamber 120 are in communication with the air passage 13 through the vacant space 1235 between the brackets 1233 of the piezoelectric actuator 123.

FIG. 7A to FIG. 7E schematically illustrate the actions of the air pump of FIGS. 4A and 4B. Please refer to FIG. 6 and FIG. 7A to FIG. 7E. The actions of the air pump will be described as follows. When the air pump 12 is enabled, the piezoelectric actuator 123 is vibrated along a vertical direction in a reciprocating manner by using the bracket 1233 as the fulcrums. The resonance plate 122 except for the part of it fixed on the gas inlet plate 121 is hereinafter referred as a movable part 122a, while the rest is referred as a fixed part 122b. Since the resonance plate 122 is light and thin, the movable part 122a vibrates along with the piezoelectric actuator 123 because of the resonance of the piezoelectric actuator 123. In other words, the movable part 122a is reciprocated and subjected to a curvy deformation. When the piezoelectric actuator 123 is vibrated downwardly, the movable part 122a of the resonance plate 122 is subjected to the curvy deformation because the movable part 122a of the resonance plate 122 is pushed by the air and vibrated in response to the piezoelectric actuator 123. In response to the downward vibration of the piezoelectric actuator 123, the air is introduced into the at least one inlet 121a of the gas inlet plate 121. Then, the air is transferred to the central cavity 121c of the gas inlet plate 121 through the at least one convergence channel 121b. Then, the air is transferred through the central aperture 122c of the resonance plate 122 corresponding to the central cavity 121c, and introduced downwardly into the first chamber 120. As the piezoelectric actuator 123 is enabled, the resonance of the resonance plate 122 occurs. Consequently, the resonance plate 122 is also vibrated along the vertical direction in the reciprocating manner.

As shown in FIG. 7B, during the vibration of the movable part 122a of the resonance plate 122, the movable part 122a moves down till bring contacted with the bulge 1231a of the suspension plate 1231. In the meantime, the volume of the first chamber 120 is shrunken and a middle space which was communicating with the convergence chamber is closed. Under this circumstance, the pressure gradient occurs to push the air in the first chamber 120 moving toward peripheral regions of the first chamber 120 and flowing downwardly through the vacant spaces 1235 of the piezoelectric actuator 123.

Please refer to FIG. 7C, which illustrates consecutive action following the action in FIG. 7B. The movable part 122a of the resonance plate 122 has returned its original position when, the piezoelectric actuator 123 has ascended at a vibration displacement to an upward position. Consequently, the volume of the first chamber 120 is consecutively shrunken that generating the pressure gradient which makes the air in the first chamber 120 continuously pushed toward peripheral regions. Meanwhile, the air continuously introduced into the inlets 121a of the gas inlet plate 121 and transferred to the central cavity 121c.

Figure 7D:
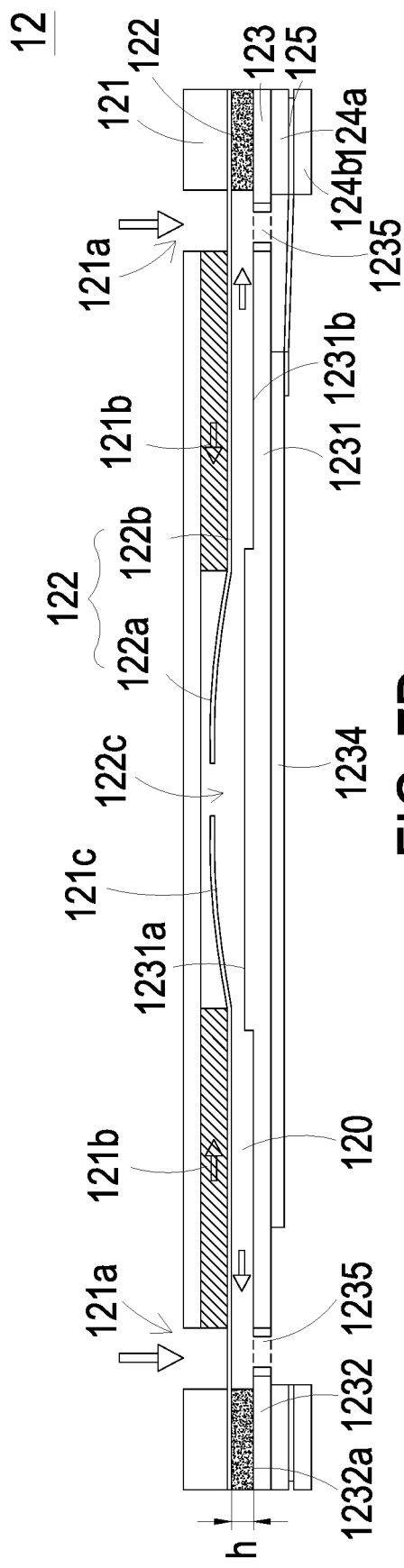

Then, as shown in FIG. 7D, the resonance plate 122 moves upwardly, which is caused by the resonance of the upward motion of the piezoelectric actuator 123. Consequently, the air is slowly introduced into the inlets 221a of the gas inlet plate 121, and transferred to the central cavity 121c.

Figure 7E:
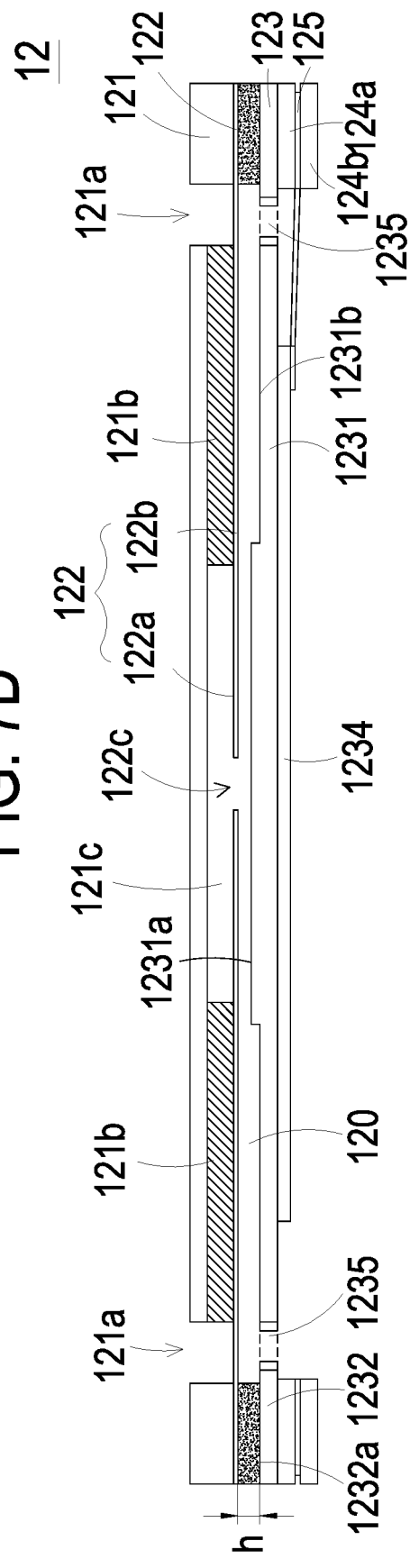

As shown in FIG. 7E, the movable part 122a of the resonance plate 122 has returned its original position. When the resonance plate 122 is vibrated along the vertical direction in the reciprocating manner, the gap h between the resonance plate 122 and the piezoelectric actuator 123 providing space for vibration of the resonance plate 122. That is, the thickness of the gap h affects the amplitude of vibration of the resonance plate 122. Consequently, a pressure gradient is generated in the fluid channels of the air pump 12 to facilitate the air to flow at a high speed. Moreover, since there is an impedance difference between the feeding direction and the exiting direction, the air can be transmitted from the inlet side to the outlet side. Moreover, even if the outlet side has a gas pressure, the air pump 12 still has the capability of pushing the air to the air passage 13 while achieving the silent efficacy.

The steps of FIG. 7A to FIG. 7E are repeatedly done. Consequently, the ambient air is transferred by the air pump 12 from the outside to the inside.

As mentioned above, the operation of the air pump 12 can guide the air into the air passage 13, such that the guided air is introduced into the inflatable cushion 11, and the inflatable cushion 11 is inflated and expanded to fit the user's foot surface. Therefore, the shoe 2 may be tightly and firmly attached to the user's foot, thereby providing sufficient support and protection for safe and comfortable wearing.

From the above descriptions, the present invention provides an inflatable charging device applied to a shoe. The weight sensor of the inflatable charging device detects the load of a foot, and then the inflatable cushion is inflated automatically and intelligently to fit the shape of foot that provides comfort as well as sufficient support and protection. Meanwhile, through disposing the charging power source, the pressure of the user's foot can be utilized to drive the charging power source to perform autonomous charging, and additional external device can be connected for charging, which is extremely practical. Furthermore, an air pressure adjustment function is provided to automatically adjust the internal air pressure according to the usage status, which prolongs the life span of the inflatable cushion and makes the shoe in an optimum comfortable status to wear. In addition, the pressure inside of the inflatable cushion is manually adjustable, thereby providing more convenience in operation and wider applicability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inflatable charging device applied to a shoe, wherein the shoe comprises a shoe body and a bottom part connected to the shoe body, such that a wear space and an opening communicated with the wear space are collaboratively defined by the shoe body and the bottom part, the inflatable charging device comprising:
    an inflatable cushion disposed in the shoe body;
    an air passage arranged between the inflatable cushion and the shoe body and in air communication with the inflatable cushion;
    an air pump communicated with the air passage;
    a weight sensor disposed on the bottom part;
    an air pressure sensor disposed in the air passage;
    a control module electrically connected with the air pump, the weight sensor and the air pressure sensor; and
    a charging power source for charging an external electronic device, the charging power source is embedded in the bottom part and electrically connected with the control module, wherein the charging power source comprises a pressing plate, a pressure electric generator, a rechargeable battery, and a power source output port, wherein a first end of the pressing plate is pivotally connected with the pressure electric generator, and a second end of the pressing plate is disposed on the bottom part to be pressed by a foot of the user by which the pressure electric generator generates electric power, wherein the rechargeable battery is used for storing the electric power generated by the pressure electric generator and providing the electric power to the control module, and wherein the power source output port is connected with the electric power outputted from the rechargeable battery for charging the external electronic device;
    wherein when the weight sensor detects a load, the weight sensor sends an enabling signal to the control module, and the control module drives the air pump to operate according to the enabling signal, making air guided by the air passage and introduced into the inflatable cushion, so that the inflatable cushion is inflated and expanded, wherein when the air pressure sensor detects the pressure inside the inflatable cushion is higher than a specific threshold interval, the air pressure sensor sends a disabling signal to the control module and the control module accordingly stops the operation of the air pump.

2. The inflatable charging device according to claim 1 further comprising a relief valve disposed on a surface of the shoe body and in communication with the air passage.

3. The inflatable charging device according to claim 2, wherein the relief valve is manually actuated to discharge the air from the inflatable charging device through the relief valve.

4. The inflatable charging device according to claim 2, wherein the relief valve is electrically connected with the control module, and when the weight sensor detects loss or disappearance of the load, the weight sensor sends a pressure relief signal to the control module, and the control module drives the relief valve according to the pressure relief signal to discharge the air from the shoe through the relief valve.

5. The inflatable charging device according to claim 1, wherein the air pump is a piezoelectric air pump.

6. The inflatable charging device according to claim 5, wherein the piezoelectric air pump comprises:
    a gas inlet plate comprising at least one inlet, at least one convergence channel and a central cavity, wherein a convergence chamber is defined by the central cavity, and the at least one convergence channel corresponds to the at least one inlet, wherein after the air is introduced into the at least one convergence channel through the at least one inlet, the air is guided by the at least one convergence channel and converged to the convergence chamber;
    a resonance plate having a central aperture, wherein the central aperture is aligned with the convergence chamber, wherein the resonance plate comprises a movable part near the central aperture; and
    a piezoelectric actuator spatially corresponding to the resonance plate, wherein a gap is formed between the resonance plate and the piezoelectric actuator to define a first chamber, wherein when the piezoelectric actuator is driven, the air is introduced into the air pump through the at least one inlet of the gas inlet plate, converged to the central cavity through the at least one convergence channel, transferred through the central aperture of the resonance plate, and introduced into the first chamber, wherein the air is further transferred through a resonance between the piezoelectric actuator and the movable part of the resonance plate.

7. The inflatable charging device according to claim 6, wherein the piezoelectric actuator comprises:
    a suspension plate having a first surface and a second surface, wherein the suspension plate is permitted to undergo a curvy vibration;
    an outer frame arranged around the suspension plate;

at least one bracket connected between the suspension plate and the outer frame for elastically supporting the suspension plate; and a piezoelectric plate, wherein a length of the piezoelectric plate is smaller than or equal to a length of the suspension plate, and the piezoelectric plate is attached on the first surface of the suspension plate, wherein when a voltage is applied to the piezoelectric plate, the suspension plate is driven to undergo the curvy vibration.

8. The inflatable charging device according to claim 7, wherein the suspension plate is a square suspension plate with a bulge.

9. The inflatable charging device according to claim 6, wherein the piezoelectric air pump further comprises a conducting plate, a first insulation plate and a second insulation plate, wherein the gas inlet plate, the resonance plate, the first insulation plate, the conducting plate and the second insulation plate are stacked on each other sequentially.

* * * * *